Mar. 20, 1923.
R. HÄNY
CUTTING DEVICE
Filed Apr. 4, 1922
1,449,040
3 sheets-sheet 1
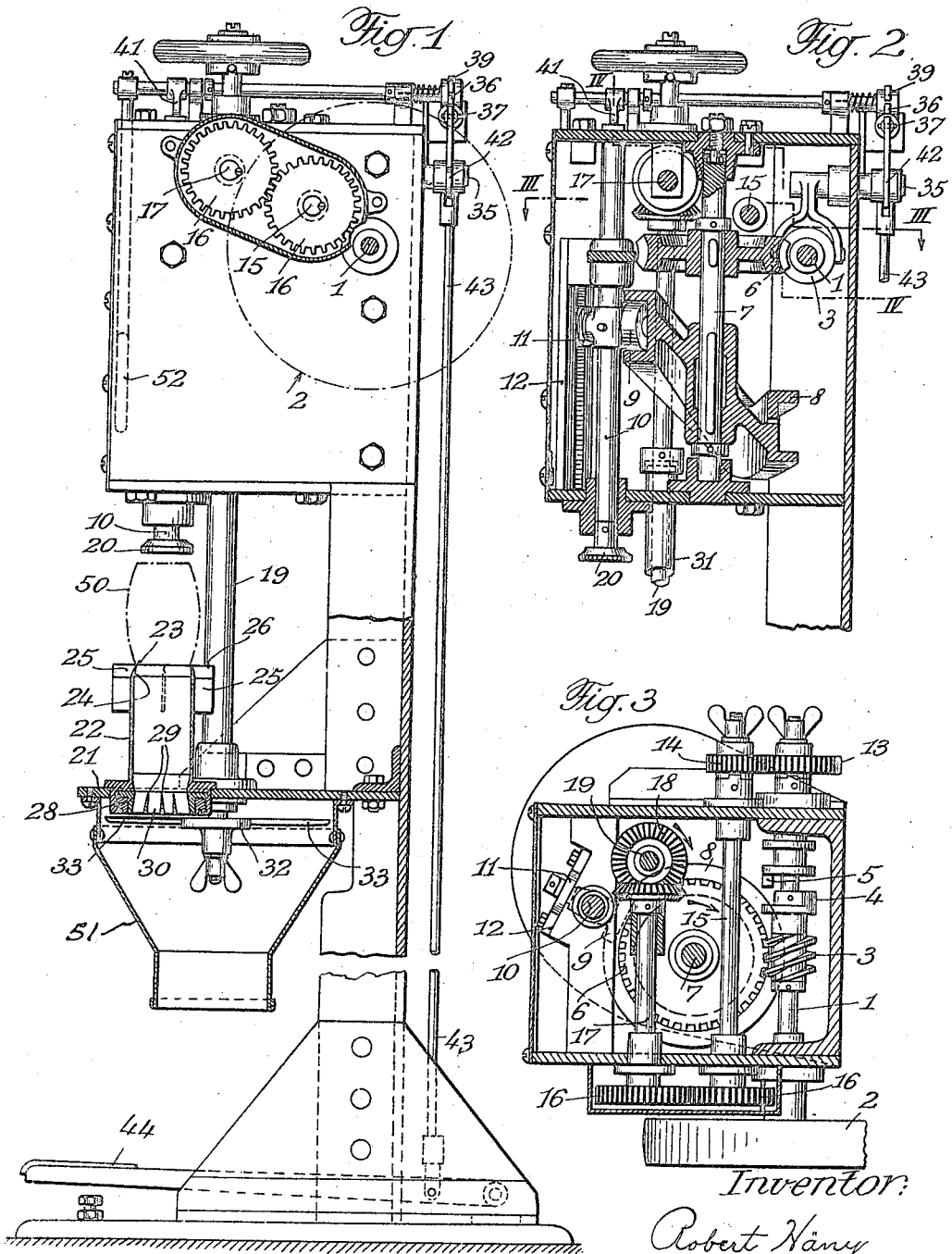
Inventor:
Robert Häny

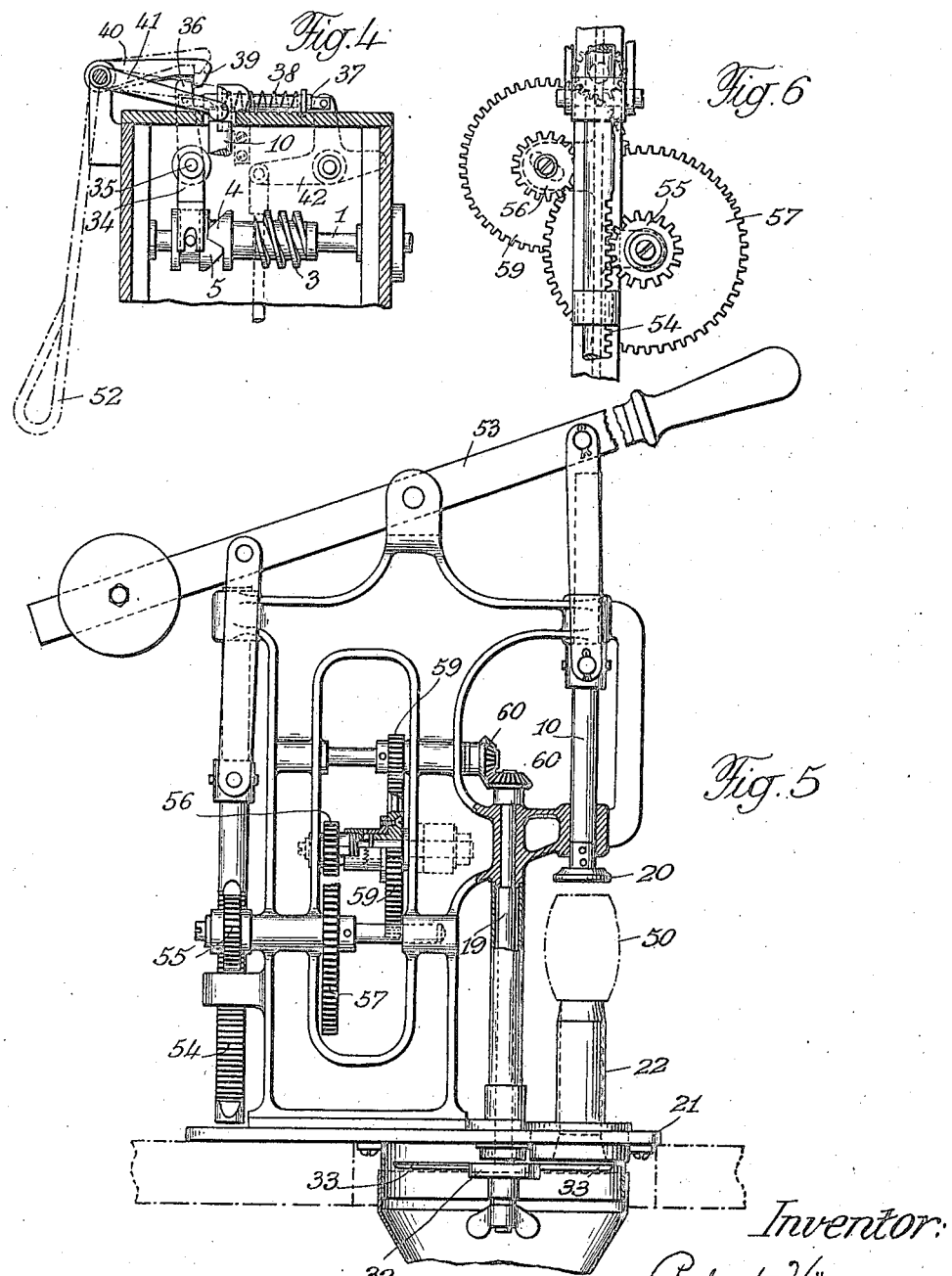

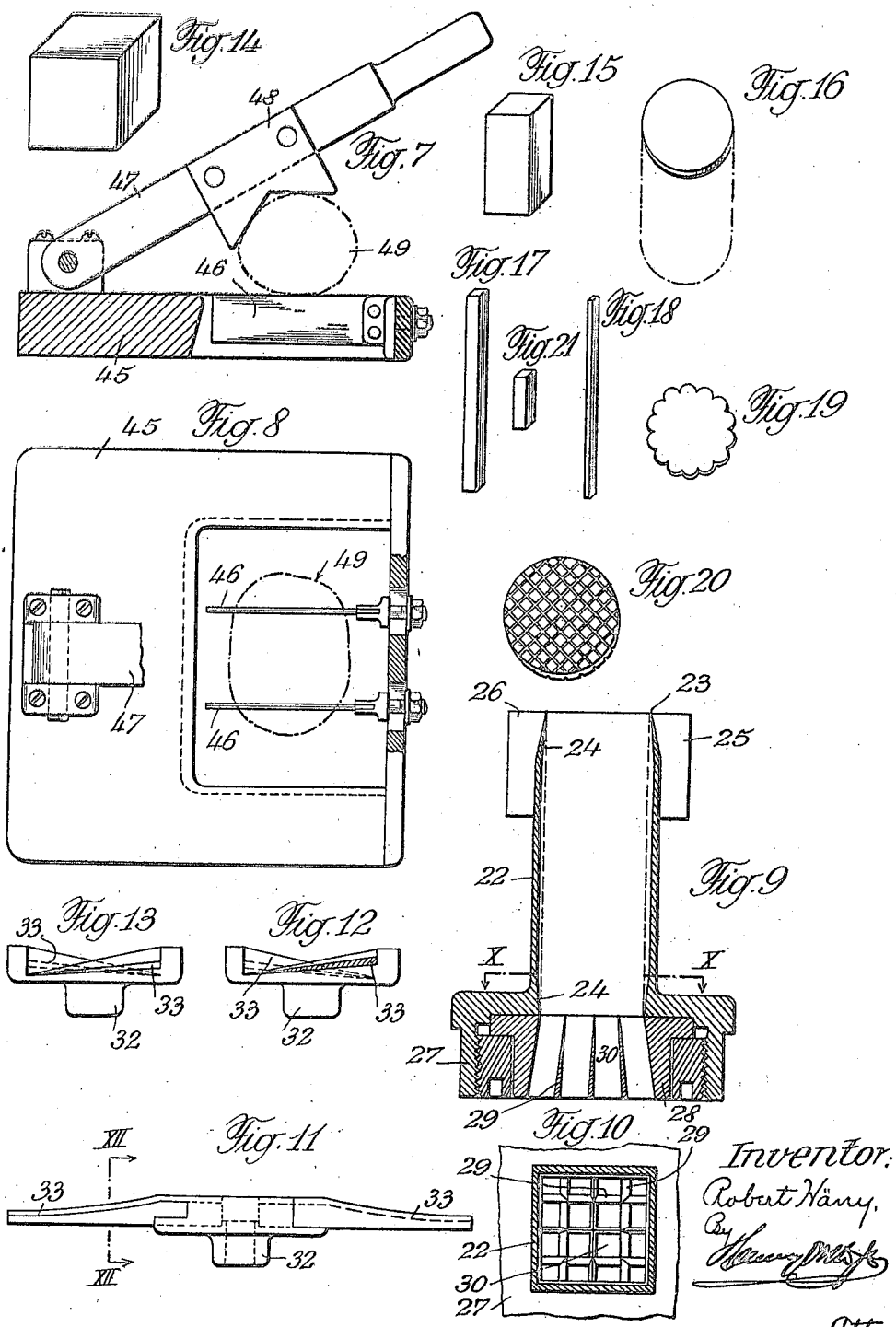

Patented Mar. 20, 1923.

1,449,040

UNITED STATES PATENT OFFICE.

ROBERT HÄNY, OF OBERMEILEN, SWITZERLAND, ASSIGNOR TO THE FIRM HÄNY & CO., OF OBERMEILEN, SWITZERLAND.

CUTTING DEVICE.

Application filed April 4, 1922. Serial No. 549,461.

*To all whom it may concern:*

Be it known that I, ROBERT HÄNY, a citizen of the Republic of Switzerland, residing at Obermeilen, Switzerland, have invented certain new and useful Improvements in Cutting Devices, of which the following is a specification, reference being had therein to the accompanying drawing.

Devices are already known for cutting shaped bodies of potatoes, turnips and the like having a stamping arrangement consisting of a stamp and a die and a cutting contrivance of the rotary type operatively connected to the stamping arrangement for cutting the material that has passed the die into bars and discs.

The present invention relates to improvements in devices of this type and presents the advantage that first of all the stamping arrangement becomes operative before the cutting contrivance. Further exchangeable parts are provided in order to enable to produce discs of any desired thickness up to the size of the stroke of the stamp of the stamping arrangement. The movement of the stamp in the downward direction is always dependent in a determined and adjustable ratio to the turning motion of the exchangeable knives. Thereby it is rendered possible to cut a body shaped by stamping through dies into discs of the same thickness. By an exchange of parts of the device the thickness of said discs can be chosen at will, and all the cut discs will have the same thickness.

In the accompanying drawings embodiments of the object of the present invention are illustrated by way of example.

In the drawings:

Fig. 1 is an elevation of a first constructional example of the machine, some parts being shown in section;

Fig. 2 is a vertical section through some of the parts shown in Fig. 1;

Fig. 3 is a section along line III—III of Fig. 2;

Fig. 4 is a section along line IV—IV of Fig. 2;

Fig. 5 shows in a side elevation a second constructional example;

Fig. 6 is a front elevation of some parts of the second constructional example,

Fig. 7 is a side elevation of a device for preliminary cutting the material and

Fig. 8 is a plan view of Fig. 7.

Fig. 9 illustrates a detail of Fig. 1 on a larger scale,

Fig. 10 is a section along line X—X of Fig. 9,

Fig. 11 is a side view of the rotary knife,

Fig. 12 is a section along line XII—XII of Fig. 11,

Fig. 13 is an end view of the rotary knife, and

Figs. 14–21 are illustrations of differently shaped products produced with the device according to the present invention.

Referring to the first constructional example illustrated in Figs. 1–4, 1 denotes the main shaft to which rotation is imparted for instance by a belt pulley 2. Between set collars fixed on the shaft 1 a worm 3 is rotatably mounted on said shaft but is prevented from being displaced in the axial direction, one end of the worm 3 being arranged to form one half 4 of a clutch having one jaw or tooth. The other half 5 of the coupling is mounted on shaft 1 in such a way that it can be displaced in the axial direction but cannot turn relatively to the shaft. The worm 3 co-operates with a wormwheel 6 secured to a vertical shaft 7, a grooved disc 8 consisting of two unequal parts being secured to the shaft 7. Into the groove of the disc 8 a roller 9 projects which is connected to a stamp 10 so that upon a turning of the curved disc 8 the stamp 10 is displaced in the downward direction at a uniform speed and is returned in the upward direction at a greater speed than that with which it moves in the downward direction owing to the unequal parts of the grooved disc 8. On the opposite side of the stamp 10 to that on which the roller 9 is arranged a roller 11 is provided that runs along a vertical guide 12.

On the shaft 1 there is provided outside the casing of the device a gear wheel 13 which is in mesh with a gear wheel 14 secured to a shaft 15. The pair of gear wheels 13, 14 is exchangeable and can be replaced by pairs of gear wheels of other ratios. The shaft 15 actuates a shaft 17 by means of the pair of gear wheels 16, and by means of a bevel gear 18 to a vertical shaft 19 extending in the downward direction rotation is imparted from the shaft 17.

Vertically below the head 20 of the stamp a die 22 is loosely and exchangeably inserted in a table 21 provided with suitable apertures, the relative arrangement being such that the head 20 of the stamp may just about touch the uppermost edge of the die 22 at the end of its downward stroke. The die 22 (Fig. 9) is a hollow body of approximately a square cross-section and being provided with an upper cutting-edge 23 and having constricted portions 24 at its upper and at its lower end. In its upper part the die 22 is provided exteriorly with four wings 25 having upper cutting edges 26, the thickness of the wings may increase in the downward direction. In the lower part 27 of the die 22 there is a lower die 28 exchangeably inserted which is provided with knife edges 29 arranged at right angles to each other, the thickness of which increases in the downward direction. The knife edges 29 adjacent to the middle are vertical whereas the others are inclined towards the central axis so that the cross-sectional area of the channels 30 confined by these knives 29 increases in the downward direction (Figs. 9 and 10).

The shaft 19 passes through a tube 31 and through the table 21 and to the lower end of the shaft 19 an exchangeable cutter block 32 adapted to hold knives in position is attached (Figs. 1, 11–13). To the cutter-block 32 there are fitted horizontal knife blades 33 extending in the radial direction below the lower die 28, the blades 33 being twisted to form helicoidal surfaces (Figs. 11–13) for the purpose explained hereinafter. The knives 33 and the stamp 20 are thus positively moved from the worm 3 so that upon the pair of gear wheels 13, 14 being exchanged the transmission ratio of the movement of the knives 33 as well as of the stamp 20 is changed in a similar proportion.

A forked lever 34 (Fig. 4) which is rigidly fixed to an axle 35 that is rotatably mounted in the casing coacts with the part 5 of the clutch. Further to the axle 35 there is rigidly secured a pawl 36 to which a tie rod 37 is pivoted. The latter is acted upon by a spring 38 which tends to pull the pawl against the projecting part 39 of a latch lever 40 when the stamp 19 is not in its highest position. A lever 41 is rigidly connected to the lever 40 the former projecting with its round head into the path of the upper end of the stamp 10.

When the stamp moves into its highest position it causes a turning motion of the lever 41 in the anti-clockwise direction whereby the latch 40 is lifted off the pawl 36. As soon as the pawl 36 is released it is attracted by the spring 38 and the lever 34 then causes the disengagement of the coupling.

To the other end of the tie rod 37 a bell crank lever 42 is operatively connected, which is pivoted by means of a rod 43 (Figs. 4 and 1) to a foot lever 44.

A preliminary cutting device illustrated in Figs. 7 and 8 has to be utilized in connection with the above described machine. In the base part 45 of this device two knives 46 arranged vertically at a distance from each other with their upper edges formed as cutting edges are inserted. To a hand lever 47 turnably mounted in a bracket of the base part a block 48 is fixed which is adapted to pass between the knives 46 when the hand lever is depressed.

If now out of potatoes bodies for instance shaped as shown in Fig. 21 have to be produced, at first a peeled potato 49 (Figs. 7 and 8) is cut in the preliminary cutting device 45–48, i. e. by a pressure on the hand lever 47 the two end parts are cut off, which parts may be used for other purposes for instance for making mashed potatoes. Then the potato block 50 (Fig. 1) is placed on the upper edge of the die 22, the foot lever 44 (Fig. 1) being in its uppermost position, the clutch 4, 5 being disengaged and the worm 3 standing still. Thereupon the foot lever 44 is depressed whereby the clutch 4, 5 is thrown into engagement, the worm 3 then positively causes the stamp 10 to move in the downward direction at a uniform speed which is in a determined ratio to the speed of the worm 3 owing to a given pair of exchangeable gear wheels 13, 14 being interposed in the drive. In this manner the potato block 50 is transformed into a prismatic body, the parts of the potato block 50 that project beyond the edge of the die 22 being cut into several parts by means of the knife blades 25, these parts dropping onto means not illustrated in the drawings for being removed therefrom. The prismatic potato body is now inside the die 22 and is kept in position by the lower constricted part 24. When a subsequent potato block is pushed into the die 22 by the stamp 10 the body inside the die is pressed through the lower die 28 whereby it is cut into strips or bars and comes within the reach of the knife blades 33, which cut from these strips pieces as illustrated in Fig. 21, the finished pieces falling through the funnel 51 of the machine, which funnel serves at the same time as a guard for the rotary knives 33. When the stamp 10 has again attained its highest position it causes a throwing out of gear of the clutch 4, 5 (Fig. 4) and the stamp 10 comes to a stand still. The disengagement of the clutch 4, 5 may be effected at any time by means of a hand lever 52 which is rigidly connected to the lever 41.

When the cutter block 32 is removed strips of potatoes as shown in Fig. 17 or 18 can be produced according to the lower die 28 inserted. When the lower die 28 is removed cubes as shown in Fig. 14 can be produced. When the lower die 28 and the knives 33 are removed prismatic pieces of potatoes having the same cross-section as the die 22 are obtained. The die 22 of rectangular cross-section can be exchanged for a die of circular cross-section in case bodies of a cylindrical shape have to be produced. The inner wall of the die 22 may be shaped in any suitable manner for instance to produce bodies as shown in Fig. 19 or star-shapes or the like.

Upon an interposition of another pair of gear wheels 13, 14 the ratio for the movement of the cutter block 33 which may be exchanged for a cutter block provided with a larger number of blades, may be so choosen that, when the lower die 28 is removed, disc shaped bodies as shown in Figs. 16 and 19 or discs having a differently shaped circumference may be obtained. If suitably shaped knives 33 are used discs as shown in Fig. 20 having fluted surfaces may be produced. In this manner by a suitable exchange of the gear wheels 13, 14, of the knives 33 and of the dies 22 and 28 a large number of differently shaped bodies can be produced which heretofore have been cut manually with great difficulties for instance in the kitchens of big hotels.

The knife blades 33 are propeller shaped as the vegetable matter to be cut is pressed in the downward direction at a uniform speed, whereas the cutting speed in the neighborhood of the shaft 19 is slower than at the outer end of the blade, without the provision of propeller shaped knife blades the material to be cut would press in some places too much on said knife blades.

The constructional example illustrated in Figs. 5 and 6 is particularly adapted for being manually operated. The stamp 10 is pivoted to a hand lever 53 balanced by a counter-weight, to which lever a toothed rack 54 is operatively connected; this rack 54 being in mesh with a gear wheel 55. The latter actuates by means of a gear wheel 56, a gear wheel 57 adapted to be exchanged. The gear wheel 56 being in operative connection with a pair of gear wheels 59, through the interposition of a coupling 58 of the known free wheel mechanism type which is only operative upon a turning motion in the one direction. The turning of the shaft 19 actuating the revolving knives is derived from the turning motion of the pair of gear wheels 59 by the interposition of a bevel gearing 60. When the hand lever 53 is pressed in the downward direction the stamp 10 is moved downwardly and the shaft 19 actuating the revolving knives is turned at a greater or smaller speed according to the ratio of the gear wheels 57, 56. When the hand lever 53 is raised the coupling 58 becomes inoperative so that the shaft 19 does not turn in the reversed direction but continues in its rotation.

I claim:

1. A device of the type described, comprising in combination, a stamp device having a reciprocating stamp and dies and adapted to force the material to be cut through said dies, a rotary cutting device adapted to cut the material leaving the stamp device, driving means adapted to operate said stamp device at uniform speeds during the operative stroke of the stamp, and to operate said cutting device at speeds which are in a determined ratio to the speeds of said stamp and interchangeable members interposed in said driving means for altering said ratio between the speeds at which said stamp device and said rotary cutting device are operated.

2. A device of the type described, comprising in combination a stamp device having a reciprocating stamp and knife edged dies and adapted to force the material to be cut through said dies, a rotary cutting device adapted to cut the material leaving the stamp device, driving means adapted to operate said stamp at a uniform speed during its operative stroke and to impart rotation to said rotary cutting device at speeds which are in a determined ratio to the speed of said stamp, means adapted to cause said driving means to be inoperative when the stamp returns into one of its extreme positions and interchangeable members interposed in said driving means for altering said determined ratio between the respective speeds at which said stamp device and said rotary cutting device are operated.

3. A device of the type described, comprising in combination, a stamp device having a reciprocating stamp and knife edged dies and adapted to force the material to be cut through said dies, a rotary cutting device adapted to cut the material leaving the stamp device, a driving shaft, means interposed between said driving shaft and said stamp device and said rotary cutting device for operating said stamp at uniform speeds during the working stroke of the stamp and to operate said cuting device at speeds which are in a determined ratio to the speeds of said stamp, disengageable coupling means included in said means, a foot lever for throwing into engagement said coupling means, and interchangeable members interposed in said driving means for altering said determined ratio between the respective speeds at which said stamp device and said rotary cutting device are operated.

4. A device of the type described, comprising in combination, a stamp device having a reciprocating stamp and knife edged dies and adapted to force the material to be cut through said dies, a rotary cutting device adapted to cut the material leaving the stamp device, a driving shaft, means interposed between said driving shaft and said stamp device and said rotary cutting device for operating said stamp at uniform speeds during the working stroke of the stamp and to operate said cutting device at speeds which are in a determined ratio to the speeds of said stamp, disengageable coupling means included in said means, a foot lever for throwing into engagement said coupling means, means adapted to throw said coupling means out of engagement when the stamp returns into one of its extreme positions, and interchangeable members interposed in said driving means for altering said determined ratio between the respective speeds at which said stamp device and said rotary cutting device are operated.

5. A device of the type described, comprising in combination, a table, a stamp device having a stamp adapted to be reciprocated perpendicularly to and above said table, an interchangeable die inserted in said table vertically below said stamp and having an upper knife edge and an interior constricted portion at its lower end, a lower interchangeable die provided vertically below said first mentioned die, having knife edges arranged so that the channels formed between said knife edges widen out in the downward direction, the stamp being adapted to force the material to be cut through said die, a rotary cutting device adapted to cut the material leaving the stamp device, driving means adapted to operate said stamp device at uniform speeds during the operative stroke of the stamp and to operate said cutting device at speeds which are in a determined ratio to the speeds of said stamps, interchangeable members interposed in said driving means for altering said determined ratio between the respective speeds at which said stamp device and said rotary cutting device are operated.

6. A device of the type described, comprising in combination, a stamp device having a reciprocating stamp and knife edged dies, and adapted to force the material to be cut through said dies, a rotary cutting device having knives shaped like propeller blades and adapted to cut the material leaving the stamp device, driving means adapted to operate said stamp at a uniform speed during its operative stroke and to impart rotation to said rotary cutting device at speeds which are in a determined ratio to the speed of said stamp, means adapted to cause said driving means to be inoperative when the stamp returns into one of its extreme positions, and interchangeable members interposed in said driving means for altering said determined ratio between the respective speeds at which said stamp device and said rotary cutting device are operated.

In testimony whereof I affix my signature.

ROBERT HÄNY.